US012571693B2

(12) United States Patent
Matus et al.

(10) Patent No.: US 12,571,693 B2
(45) Date of Patent: Mar. 10, 2026

(54) GRAVITY-ACTIVATED DISPLAYS COMPRISING PATTERNED MICROCELL ARRAYS

(71) Applicant: E INK CORPORATION, Billerica, MA (US)

(72) Inventors: Yuriy Borisovich Matus, Pleasanton, CA (US); Chandra Bikram Kc, San Jose, CA (US); Haiyan Gu, Fremont, CA (US); Ajeet Kumar, Fremont, CA (US); Bryan Hans Chan, San Francisco, CA (US)

(73) Assignee: E Ink Corporation, Billerica, MA (US)

( * ) Notice: Subject to any disclaimer, the term of this patent is extended or adjusted under 35 U.S.C. 154(b) by 420 days.

(21) Appl. No.: 18/309,995

(22) Filed: May 1, 2023

(65) Prior Publication Data

US 2023/0358625 A1     Nov. 9, 2023

Related U.S. Application Data

(60) Provisional application No. 63/338,156, filed on May 4, 2022.

(51) Int. Cl.
| | |
|---|---|
| *G01L 1/26* | (2006.01) |
| *B42D 25/29* | (2014.01) |
| *B42D 25/36* | (2014.01) |
| *B42D 25/45* | (2014.01) |

(52) U.S. Cl.
CPC ............... *G01L 1/26* (2013.01); *B42D 25/29* (2014.10); *B42D 25/36* (2014.10); *B42D 25/45* (2014.10)

(58) Field of Classification Search
CPC ........... G01L 1/26; B42D 25/29; B42D 25/36; B42D 25/45
See application file for complete search history.

(56) References Cited

U.S. PATENT DOCUMENTS

| | | | |
|---|---|---|---|
| 6,930,818 B1 | 8/2005 | Liang et al. | |
| 6,933,098 B2 | 8/2005 | Chan-Park et al. | |
| 7,312,916 B2 | 12/2007 | Pullen et al. | |
| 7,715,088 B2 | 5/2010 | Liang et al. | |

(Continued)

FOREIGN PATENT DOCUMENTS

| | | |
|---|---|---|
| JP | 2019077150 A | 5/2019 |
| WO | 2009100874 A2 | 8/2009 |
| WO | 2017095178 A1 | 6/2017 |

OTHER PUBLICATIONS

Harvey, T.G.; "Replication techniques for micro-optics"; SPIE Proc. vol. 3099, pp. 76-82; 1997. Jan. 1, 1997.

(Continued)

*Primary Examiner* — James A Dudek
(74) *Attorney, Agent, or Firm* — Brian D. Bean

(57) ABSTRACT

Gravity-actuated display systems suitable for use as security markers, for example to incorporate into bank notes. The devices can be made very thin and flexible, yet are robust enough to endure the harsh conditions of paper currency in general circulation. Because the displays are gravity actuated, they do not require a power source or circuitry. The gravity-actuated displays can be fabricated using microembossing or photolithography and can be filled and sealed using roll-to-roll techniques. The microcells can also be patterned to provide custom designs, such as official seals.

24 Claims, 8 Drawing Sheets

(56) References Cited

U.S. PATENT DOCUMENTS

| | | | |
|---|---|---|---|
| 8,883,273 | B2 | 11/2014 | Whiteman |
| 9,016,591 | B2 | 4/2015 | Herslow et al. |
| 9,902,187 | B2 | 2/2018 | Holmes |
| 10,535,211 | B2 | 1/2020 | Hussain et al. |
| 10,551,610 | B2 | 2/2020 | Brassard et al. |
| 10,921,579 | B2 | 2/2021 | Brassard et al. |
| 2010/0097687 | A1 | 4/2010 | Lipovetskaya et al. |
| 2015/0041546 | A1* | 2/2015 | Herslow ................ G06K 19/02 |
| | | | 428/338 |
| 2015/0253729 | A1 | 9/2015 | Yashiki |
| 2017/0368865 | A1 | 12/2017 | Macpherson et al. |
| 2022/0276501 | A1 | 9/2022 | Rich et al. |

OTHER PUBLICATIONS

European Patent Office, "International Search Report and Written Opinion", PCT/US2023/066361, Aug. 16, 2023. Aug. 16, 2023.
European Patent Office, "European Search Report", EP Appl. No. 25161717.1, Aug. 13, 2025. Aug. 13, 2025.
European Patent Office, "European Search Report", EP Appl. No. 25161716.3, Aug. 13, 2025. Aug. 13, 2025.

* cited by examiner

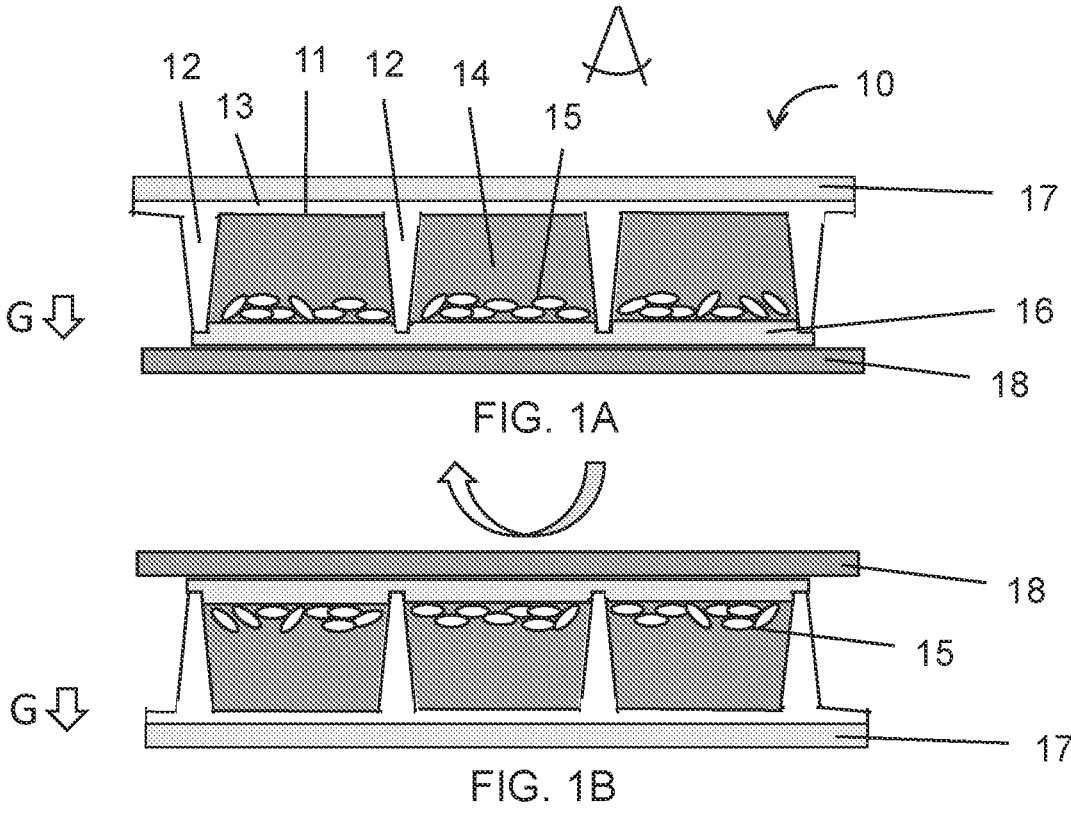
FIG. 1A
FIG. 1B
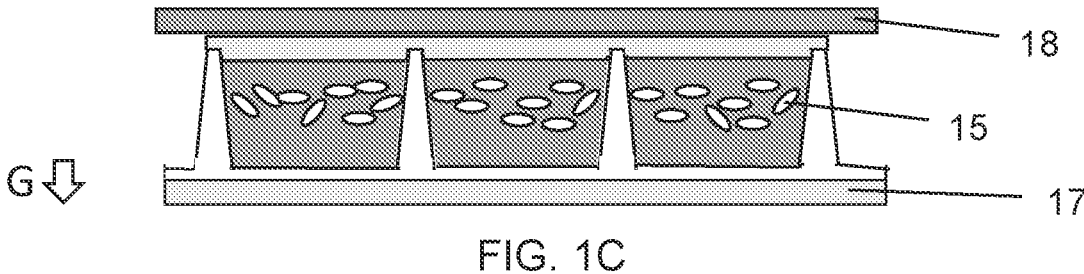
FIG. 1C
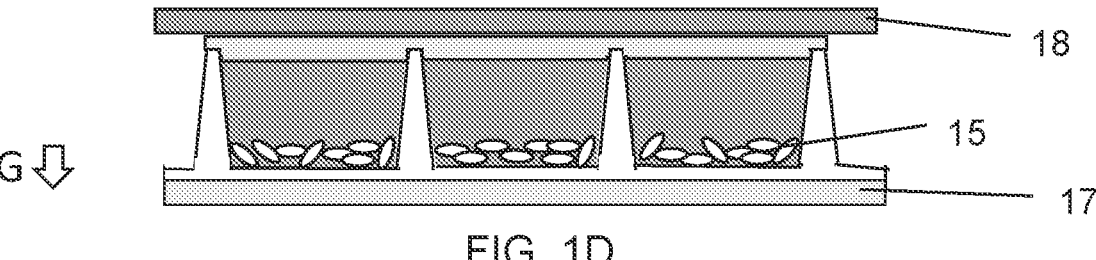
FIG. 1D (Side view)

⬡ Color 1

⬡ Color 2

⬡ No Color (Top view)

UV OR LIGHT

UV OR LIGHT (Side view)

(Top view)

(Top view)

(Top view)

Flip over
wait

Flip over wait

GRAVITY-ACTIVATED DISPLAYS COMPRISING PATTERNED MICROCELL ARRAYS

RELATED APPLICATIONS

This application claims priority to U.S. Provisional Patent Application No. 63/338,156, filed May 4, 2022. The entire contents of any patent, published application, or other published work referenced herein is incorporated by reference.

BACKGROUND

Contemporary paper currency includes a number of technological features to make it difficult for criminals to duplicate the currency. While such features add substantial cost to the printing process, such features simultaneously deter counterfeiters and increase the general public's faith in the notes that will be exchanged for value. Many countries' bank notes include features such as intaglio printing, watermarks, transparent windows, security ribbons, and micro printing. Depending upon the value of the bank note, more expensive features such as holograms and RFID circuits may be justified to deter illegal duplication. Of course, such security features are also useful in the validation of other items, such as documents, art work, clothing, sports memorabilia, historical documents, and software packaging.

One feature that has been contemplated as a high-tech authenticity marker is a so-called gravity-actuated dynamic security device. Such a device could be actuated by a user, i.e., a note holder, by simply flipping the device over, whereupon some validation signal is created. The validation signature can be optical or audible, and because the device is gravity actuated, there is no additional power source required. U.S. Pat. No. 10,921,579 ("the '579 patent") describes a number of alternative optical devices that can be used for a gravity-actuated dynamic security device, including Janus particles, differential-density particles (heavy and buoyant), differential density fluids, and rolling balls in capsules. The '579 patent does not provide detailed specifics on the construction of such devices, but rather describes the end product and the likely benefits. For example, the sedimentation display example of the '579 patent is suggested to include dense particles in a colored fluid, which are contained in one or more containers. However, the nature of the containers, the methods of creating such containers, and the method of filling such containers with the sedimentation mixture is not provided. Furthermore, the final dimensions of the security device described in the '579 patent are not suitable for incorporation into, for example, paper currency.

SUMMARY

Improved gravity-actuated dynamic security devices, such as suitable for incorporation into paper currency, are described herein. In one aspect, a gravity-actuated display includes an array of microcells, each microcell having walls, a floor, and a top opening, wherein the floor of each microcell is light-transmissive, a first mixture comprising reflective particles having a density greater than 7 grams/cm³, a hydrocarbon solvent, and a first soluble dye, wherein the first mixture is disposed in at least some of the microcells in the array, and a light-transmissive sealing layer that seals the first mixture into the at least some of the microcells. In one embodiment, the gravity-actuated display further comprises a first light-transmissive substrate coupled to the array of microcells. In one embodiment, the gravity-actuated display further comprises a second light-transmissive substrate coupled to the light transmissive sealing layer. In one embodiment, the gravity-actuated display does not include any layers having a conductivity greater than $1 \times 10^4$ Ohm cm. In one embodiment, the gravity-actuated display is less than 1 mm thick. In one embodiment, the gravity-actuated display is less 200 μm thick. In one embodiment, the gravity-actuated display further comprises a second mixture comprising the reflective particles, the hydrocarbon solvent, and a second soluble dye, wherein the second mixture is disposed in at least some of the microcells that are different from the at least some of the microcells in which the first mixture is disposed. In one embodiment, the first and second soluble dyes are different colors. In one embodiment, the reflective particles comprise silver, tungsten, gold, platinum, nickel, copper, tin, zinc, or indium. In one embodiment, the reflective particles are between 5 μm and 25 μm in longest dimension. In one embodiment, the reflective particles are metal flakes or metal whiskers. In one embodiment, the first soluble dye comprises anthraquinone, phtalocyanine, naphthalene, indole, imidazole, or thioindigo compounds. In one embodiment, the hydrocarbon solvent comprises aliphatic molecules having a molecular weight between 100 g/mol and 300 g/mol. In one embodiment, the microcell walls and floor comprise acrylates, vinyl ethers, or epoxides. In one embodiment, the sealing layer comprises polyvinyl alcohol, polyvinylpyrrolidone, polyurethane, polyisobutylene, or acrylates. In one embodiment, the first mixture further comprises a surfactant. In one embodiment, the first mixture comprises between 5-15% surfactant (wt surfactant/wt mixture), between 20-50% of reflective particles (wt particles/wt mixture), and between 1-8% soluble dye (wt soluble dye/wt mixture), the balance being hydrocarbon solvent.

In another aspect, a gravity-actuated display includes an array of microcells, each microcell having walls, a floor, and a top opening, wherein the floor of each microcell is light-transmissive, a first mixture comprising reflective particles having a density less than 0.5 grams/cm³, a hydrocarbon solvent, and a first soluble dye, wherein the first mixture is disposed in at least some of the microcells in the array, and a light-transmissive sealing layer that seals the first mixture into the at least some of the microcells. In one embodiment, the reflective particles comprise silica, zirconia, or alumina. In one embodiment, the gravity-actuated display does not include any layers having a conductivity greater than $1 \times 10^4$ Ohm·cm.

In another aspect, a magneto-gravity-actuated display including an array of microcells, each microcell having walls, a floor, and a top opening, wherein the floor of each microcell is light-transmissive, a first mixture comprising magnetic particles having a density greater than 4 grams/cm³, a hydrocarbon solvent, and a first soluble dye, wherein the first mixture is disposed in at least some of the microcells in the array, and a light-transmissive sealing layer that seals the first mixture into the at least some of the microcells. In one embodiment, the magnetic particles comprise nickel, iron, manganese or oxides thereof. In one embodiment, the magneto-gravity-actuated display does not include any layers having a conductivity greater than $1 \times 10^4$ Ohm cm.

BRIEF DESCRIPTION OF THE DRAWINGS

FIG. 1A illustrates a cut-away side view of a gravity-actuated display in a first stable state, whereby high-density reflective particles have settled at the bottom of a plurality of microcells, thereby allowing a viewer from above to observer the color of the hydrocarbon solvent including a compatible dye.

FIG. 1B illustrates the immediate effect of flipping over the gravity-actuated display of FIG. 1A.

FIG. 1C illustrates an intermediate state of the high-density reflective particles as they settle from the top surface to the bottom surface due to the differential density of the reflective particles as compared to the hydrocarbon solvent.

FIG. 1D illustrates a gravity-actuated display in a second stable state, whereby the high-density reflective particles have resettled at the bottom of a plurality of microcells, whereby the bottom surface of FIG. 1D corresponds to the top surface of FIG. 1A.

In FIGS. 5C and 5D a combination of top and bottom exposure is used, allowing the walls in one lateral direction to be cured by top photomask exposure, and the walls in another lateral direction to be cured bottom exposure through the light-transmissive substrate.

DESCRIPTION

Figure 2:
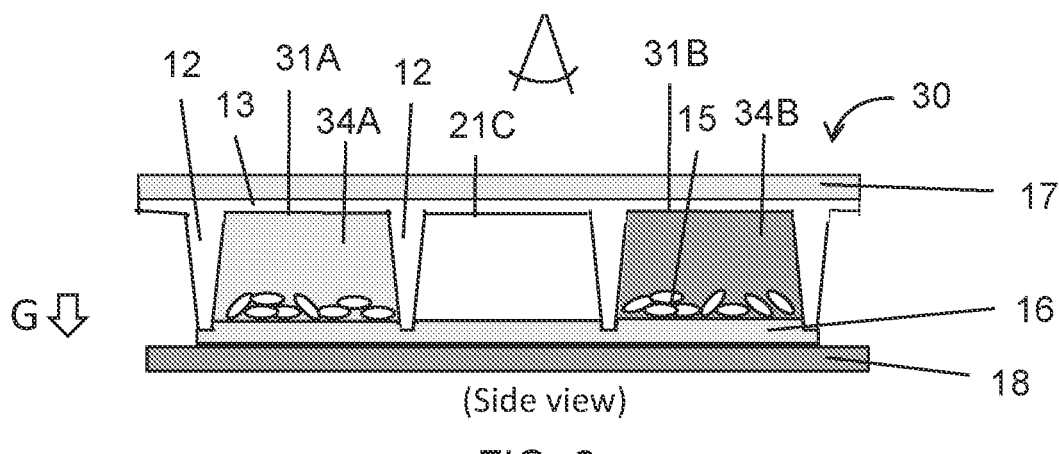
FIG. 2 illustrates a cut-away side view of an alternate embodiment in which some of the microcells include a first mixture including a first dye, some of the microcells are empty, and some of the microcells include a second mixture including a second dye.

Described herein are improved gravity-actuated display systems that are suitable for use as security markers, for example to be incorporated into bank notes. The gravity display devices can be made very thin and flexible, yet are robust enough to endure the harsh conditions of paper currency in general circulation. Because the displays are gravity actuated, they do not require a power source or circuitry. The gravity-actuated displays can be fabricated using microembossing or photolithography and can be filled and sealed using roll-to-roll techniques. The microcells can also be patterned to provide custom designs, such as official seals.

The term "filled" in relation to a microcell (or microcells) mean that a mixture is present in the microcell (or microcells). It does not necessarily mean that the whole volume of the microcell is occupied by the formulation. In other words, the term "filled" in reference to a microcell (or microcells) include the concepts of a partially filled microcell (or microcells) as well as a completely "filled" microcell (or microcells). Analogously, filling a microcell (or microcells) means that a formulation is added into a microcell (or microcells). It does not necessarily mean that sufficient amount of the formulation is being added into the microcell to occupy its entire volume. For example, a microcell may be "filled" with a mixture, yet leaving a small amount of volume compared to the microcell such that the sealing layer occupies a small portion of the microcell, e.g., as shown in FIG. 1A.

An overview of a gravity-actuated display 10 is shown in FIGS. 1A-1D. The display includes a plurality of microcells 11 including walls 12 and a floor 13. The microcells 11 may be arranged as squares, a honeycomb, circles, etc. The microcells are typically microembossed from a thermoset material, however they can be created photolithographically, as described below. In the gravity-actuated display 10 of FIGS. 1A-1D, each microcell 11 is filled with a mixture including a dyed hydrocarbon solvent 14 and high-density reflective particles 15. The hydrocarbon solvent may be a branched or straight-chain hydrocarbon, or a combination thereof. For example, the hydrocarbon solvent comprises aliphatic molecules having a molecular weight between 100 g/mol and 300 g/mol. Suitable hydrocarbon solvents include the ISOPAR® Series (Exxon Mobil), as well as octanes, nonanes, decanes, and dodecanes, which can be purchased from a chemical supplier such as Sigma Aldrich. Typically, the reflective particles have a density greater than 7 grams/$cm^3$. e.g., greater than 8 grams/$cm^3$. e.g., greater than 10 grams/$cm^3$, and are between 5 μm and 25 μm in longest dimension, e.g., between 10 μm and 20 μm in longest dimension. The reflective particles may be metal flakes or metal whiskers, such as Silver Powder D1 (Ames Goldsmith, South Glens Falls, NY) or precipitated silver flake (Sigma Aldrich, Milwaukee, WI). Other high-density reflective materials, such as tungsten, gold, platinum, nickel, copper, tin, zinc, or indium may also be used. High density alloys, such as brass and bronze may also be used. Flaked brass and bronze can be purchased from Wieland Chase (Montpelier, Ohio) or craft suppliers, such as Advanced Metallics (https://www.advancedmetallics.com/). In some instances, a dispersant or surfactant may be added to the mixture to decrease clumping among the metal flakes. For example, the hydrocarbon mixture may additionally include a SOLSPERSE® surfactant (Lubrizol, Corp., Wickliffe, OH) or a TWEEN® surfactant (Sigma Aldrich). Other dispersants may be chemisorbed onto the surface of the metal, such as charged species, i.e., polyvinylpyrrolidone. In some embodiments, the metal particles/flakes are surface coated with compatible molecules that help the metal particles/flakes to remain distributed, such as polyvinyl alcohols, polyurethanes, fatty acids.

The light-transmissive sealing layer 16 may be constructed from, e.g., a polyvinyl alcohol, a polyvinylpyrrolidone, a polyurethane, a polyisobutylene, an acrylate, a polyethylene, a polyurethane, a polycaprolactone, or a polysiloxane. While a gravity-actuated display 10 can be achieved with only filled microcells 11 and a light-transmissive sealing layer 16, a gravity-actuated display typically also includes a first light transmissive substrate 17 and a second light-transmissive substrate 18. The light-transmissive substrates 17, 18, may be constructed from any suitable light-transmissive film, however films with excellent sealing properties, such as polyethylenes, e.g., polyethylene terephthalate (PET) are favored. Other suitable light-transmissive substrates may include films made from acrylates, methacrylates, polyvinylpyrrolidones, or polystyrenes. While not shown in FIGS. 1A-1D, the gravity-actuated display 10 may include additional optically-clear adhesive layers between the light-transmissive substrates 17, 18 and the microcells 11 and/or the light-transmissive sealing layer.

The overall thickness of the gravity-actuated display 10 can be 1 millimeter or thinner, e.g., 800 μm or thinner, e.g., 500 μm or thinner, e.g., 250 μm or thinner. For example, the gravity-actuated display 10 may be between 100 μm and 1 mm in thickness, e.g., between 200 μm and 800 μm in thickness, e.g., between 300 μm and 600 μm in thickness. Because the gravity-actuated display 10 is so thin, the gravity-actuated display 10 is very flexible and can be used like a ribbon to incorporate into, e.g., security documents and bank notes. Such thin structures do not diminish the look or performance when integrated into security documents and bank notes. Additionally, because the gravity-actuated display 10 is so thin, a user may not be able to feel any changes to the texture when a gravity-actuated display 10 is integrated into a security document or banknote. In some instances, the gravity-actuated display 10 may be held in place by other structures, which may include adhesives, thread, ribbon, staples, or the gravity-actuated display 10 may be pressed between protective transparent layers that extend outward path the edge of the gravity-actuated display 10. Suitable protective (barrier) layers include polyvinyl film, polyethylene film, such as PET, polyimide films, and polyacrylate films. It is also possible that a gravity-actuated display 10 may be directly fixed to a security document or other object using an adhesive layer, which may include, for example, a polyisobutylene, an acrylic, a poly(ethylene) glycol, or a silicone.

The function of the gravity-actuated display 10 is illustrated in the transition from FIG. 1A to FIG. 1D. As shown, gravity (G) is toward the bottom of the page in all of FIG. 1A to FIG. 1D. A gravity-actuated display in a stable display state starts as shown in FIG. 1A. A viewer, looking from above as shown in FIG. 1A would see the color of the dyed hydrocarbon solvent 14 because all of the intervening layers are light-transmissive. To actuate the display, a user would flip over the gravity-actuated display 10, as shown in FIG. 1B, whereupon the viewer will briefly see the color of the high-density reflective particles 15, which are present at the (now) top viewing surface. In other words because the light-transmissive sealing layer 16 and the light-transmissive substrate 18 are both light-transmissive, a user to see light reflected off the high-density reflective particles 15. Soon after flipping over the gravity-actuated display 10, the high-density reflective particles 15 will begin to settle with gravity and move toward the (now) bottom of the gravity-actuated display 10, as shown in FIG. 1C. With time, the high-density reflective particles 15 will settle to the (now) bottom substrate 17, and a user will see the color of the dyed hydrocarbon solvent 14, very similar to, if not identical to, the initial view in FIG. 1A. For the avoidance of doubt, it is not necessary to include conductive layers in a gravity-actuated display 10, such as a layer of metal foil, carbon paste, conductive ceramic, such as ITO, or some other layer having a conductivity greater than $1 \times 10^4$ Ohm cm. However, it is possible to prepare a gravity-actuated display 10 that includes one or more conductive layers. In some embodiments, a gravity-actuated display 10 may include high-density reflective particles 15 that are electrically charged and move in a sufficient electric field, or are magnetic and can be actuated with a magnetic field, or some combination of electric charge, magnetic charge, and gravity actuated. Suitable magnetic, ferromagnetic, or antiferromagnetic particles might include high-density reflective particles 15 comprising nickel, iron, iron oxide, manganese oxide, or lanthanum manganese oxides, and such particles may be doped with charge carriers or other materials to increase or decrease the magnetic or ferromagnetic response.

The amount of time between flipping over the gravity-actuated display 10 and the high-density reflective particles 15 returning to the bottom can be modified by including free polymer or rheology modifiers in the dyed hydrocarbon solvent 14. In some embodiments, the time between flipping over the gravity-actuated display 10 and the high-density reflective particles 15 returning to the bottom will be more than 0.5 second, e.g., more than 1 second, e.g., more than 2 seconds, e.g., more than 3 seconds, e.g., more than 4 seconds. In some embodiments, the time between flipping over the gravity-actuated display 10 and the high-density reflective particles 15 returning to the bottom will be less than 20 seconds, e.g., less than 15 seconds, e.g., less than 10 seconds, e.g., less than 5 seconds. For example, the time between flipping over the gravity-actuated display 10 and the high-density reflective particles 15 returning to the bottom may be between 1-10 seconds, e.g., between 2-8 seconds, e.g., between 3-6 seconds. The viscosity of the dyed hydrocarbon solvent 14 may be greater than 0.8 centiStokes (cSt) at 25° C., i.e., greater than 1.0 centiStokes (cSt) at 25° C., i.e., greater than 1.2 centiStokes (cSt) at 25° C., i.e., greater than 1.4 centiStokes (cSt) at 25° C., i.e., greater than 1.6 centiStokes (cSt) at 25° C.

As shown in FIG. 2, a patterned gravity-actuated display 30 may include one or more microcells 31A including first dyed hydrocarbon solvent 34A and one or more microcells 31B including second dyed hydrocarbon solvent 34B. A patterned gravity-actuated display 30 may also include one or more empty microcells 31C, which do not gravity switch. Alternatively, empty microcells 31C may be filled with a hydrocarbon solvent without high-density reflective particles 15. Filling the non-switching microcells 31C may help with sealing the surrounding microcells 31A/31B with light-transmissive sealing layer 16. Filling the non-switching microcells 31C may also facilitate index matching of the interfaces across the patterned gravity-actuated display 20, for example if a user needs to look through the patterned gravity-actuated display 20, for example to view an additional security marker. In some embodiments, the non-switching microcells 31C may also include a third dye or the first or the second dye or some combination thereof. However, because the high-density reflective particles 15 are not present, the dyed hydrocarbon solvent is always visible in the non-switching microcells 31C.

Any dye that is soluble in the hydrocarbon solvent is suitable for incorporation into gravity-actuated displays 10, including patterned gravity-actuated displays 20. Such dyes may include anthraquinone, phtalocyanine, naphthalene, indole, imidazole, or thioindigo compounds. Suitable dyes include so called solvent dyes, such as Solvent Blue 89 HF, Solvent Green M HF, Solvent Purple RS HF, Solvent Red 175 HF, and Solvent Red IK HF, all available from Abbey Color (Philadelphia, PA). Accordingly, dyed hydrocarbon solvents used in the invention can include red, orange, yellow, green, blue, indigo, or violet. The color saturation of the dyed hydrocarbon solvent will depend upon the amount of dye added to the hydrocarbon solvent. Suitable saturation can be achieved with as little as 0.5% soluble dye (weight dye/weight hydrocarbon mixture including high-density reflective particles 15), however dyed hydrocarbon mixtures typically include 1-8% soluble dye, e.g., 2-5% soluble dye. In some embodiments, the hydrocarbon mixture may additionally include a surfactant, such as a SOLSPERSE® surfactant (Lubrizol, Corp., Wickliffe, OH) or a TWEEN® surfactant (Sigma Aldrich). In some embodiments, the dyed hydrocarbon mixture comprises between 5-15% surfactant (wt surfactant/wt mixture), between 20-50% of reflective particles (wt particles/wt mixture), and between 1-8% soluble dye (wt soluble dye/wt mixture), the balance being hydrocarbon solvent.

Figure 3:
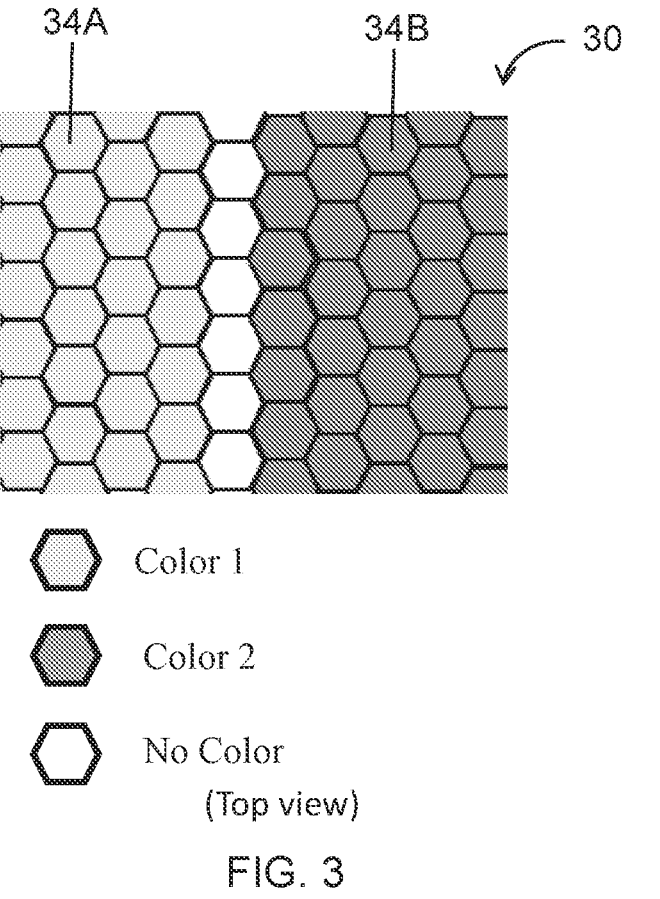
FIG. 3 illustrates an exemplary top view of a gravity-actuated display wherein some of the microcells include a first mixture including a first dye, some of the microcells are empty, and some of the microcells include a second mixture including a second dye.

Because certain microcells can be filled with specific mixtures of dyed hydrocarbon solvents, it is possible to create patterns in a patterned gravity-actuated displays 20, as shown in FIG. 3. Using slot coaters with adjustable feed channels, it is possible to produce a variety of lines, shapes, logos, etc. in an array of microcells using only preferential microcell filling prior to sealing, i.e., as discussed below. In other embodiments, not shown in the figures, it is also possible to combine separate segments of microcells, where each separate segment is filled with differently dyed hydrocarbon fluids, to create a pattern in a gravity-actuated display. It is also possible to use microcell arrays having varying microcell widths or depths to create patterns which can be used as a further indication of authenticity. For example, microcells having a depth that is twice as deep as other microcells may take longer to return to a stable state after the gravity-actuated display is flipped over. Alternatively, microcells having a depth that is half as deep as other microcells may not achieve a saturated color state when in a stable state because the high-density reflective particles are partially visible when the high-density reflective particles are at the bottom of the shallower microcell.

In another embodiment, not shown in the figures, the high-density reflective particles can be replaced with buoyant reflective particles that rise to the surface when the gravity-actuated display is flipped over. Thus, where FIG. 1A-1D shows the reflective particles falling down with gravity, the reflective particles in this embodiment would rise up to the viewing surface. Thus, the stable default color of the gravity-actuated display would typically be white or some other reflective color and when the display was flipped over, the color of the dyed hydrocarbon solvent would be seen until such a time as the buoyant reflective particles rose to the viewing surface. Suitable buoyant reflective particles typically have a density of less than 0.5 grams/cm$^3$, and may include silica, zirconia, or alumina. Suitable buoyant particles are available from Polysciences, Inc. (Warrington, PA).

Figures 8A, 8B, 8C, 8D:
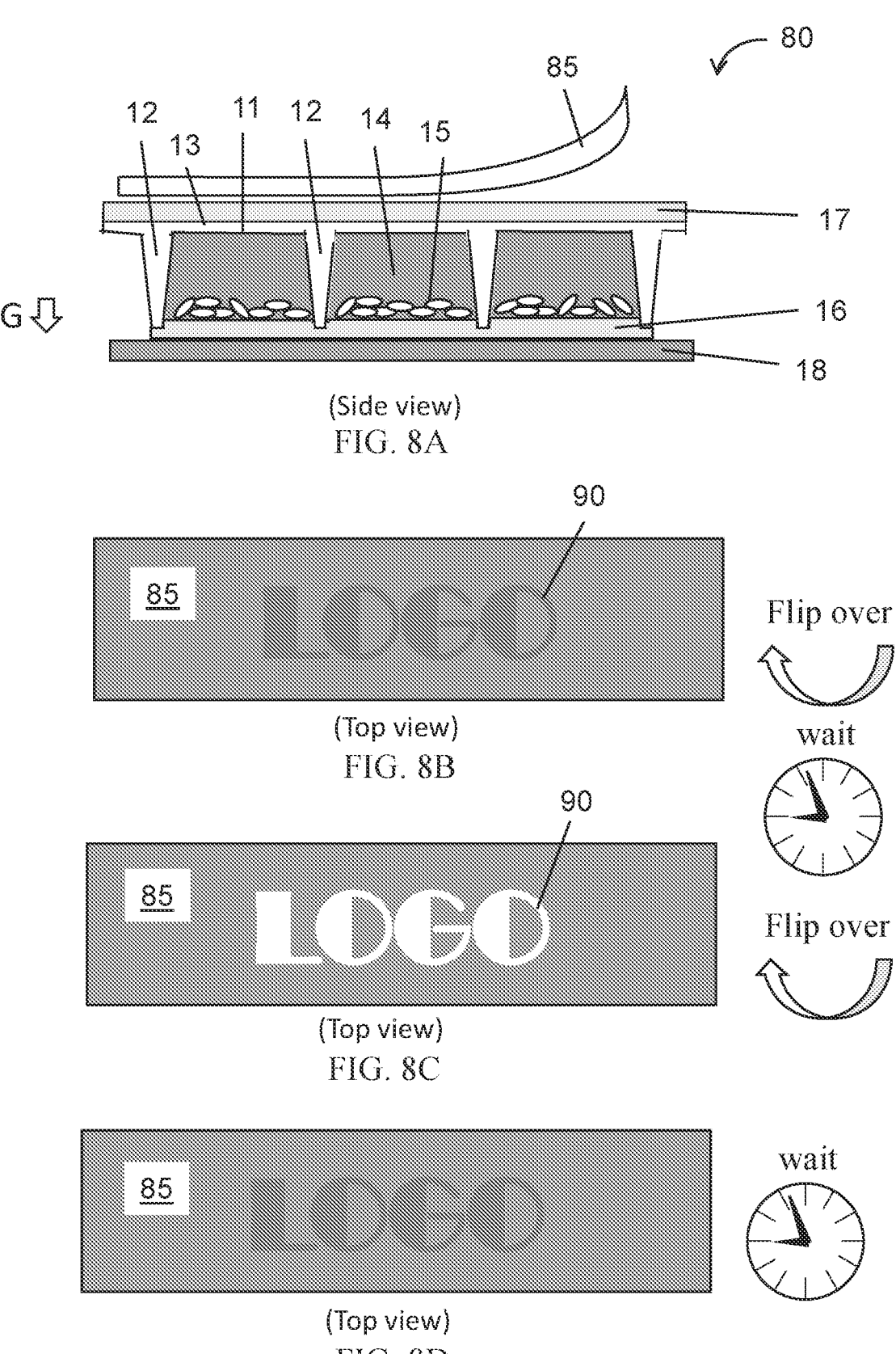
FIGS. 8A-8D illustrate an alternative embodiment of a gravity-actuated display, which includes an overlay film having a base color and a logo cut out. When the base color matches the color of the hydrocarbon solvent including a compatible dye, the logo is invisible in the default state (FIG. 8B). However, when the device is flipped, the high-density reflective particles are allowed to settle on the overlay side, and the device is flipped a second time, the logo will "appear" briefly because the high-density reflective particles have moved to the surface adjacent the overlay film (FIG. 8C). With time, the high-density reflective particles will resume their initial position, and the logo will disappear (FIG. 8D).

In another embodiment, illustrated in FIGS. 8A-8D, a gravity-actuated display 10, or a patterned gravity-actuated display 20, can be combined with a graphic overlay 85, which masks a portion of the display from a viewer, to create a gravity-actuated overlay display 80. The graphic overlay 85 is typically a thin film, which may be constructed from a light-transparent film, such as PET, whereby a pattern, such as a corporate logo, or an identification number are printed on the film, e.g., with screen printing or ink jet printing. In other embodiments, the graphic overlay 85 may be physically cut from a colored film to partially mask the underlying gravity-actuated display from the viewer. The desired pattern may positive, meaning that the pattern itself is printed onto, or made from cut pieces adhered to, the film. The desired pattern may be negative, meaning that everything but the pattern is printed onto the film or that the shape of the pattern is cut from a colored film. The printed portions or cut colored film may be color-matched to the color of the reflective particles or to color match the soluble dye. It is understood that an optically-clear adhesive layer (not shown) will typically be used to bond the graphic overlay 85 to the underlying display. Additionally, while only one graphic overlay 85 is shown in FIG. 8A, it is straightforward to apply a second graphic overlay (not shown in FIG. 8A) to the bottom of the display, thus allowing the gravity-actuated overlay display 80 to change appearance with each flip. Additionally, the first and second graphic overlays may include the same pattern or different patterns.

Figure 4:
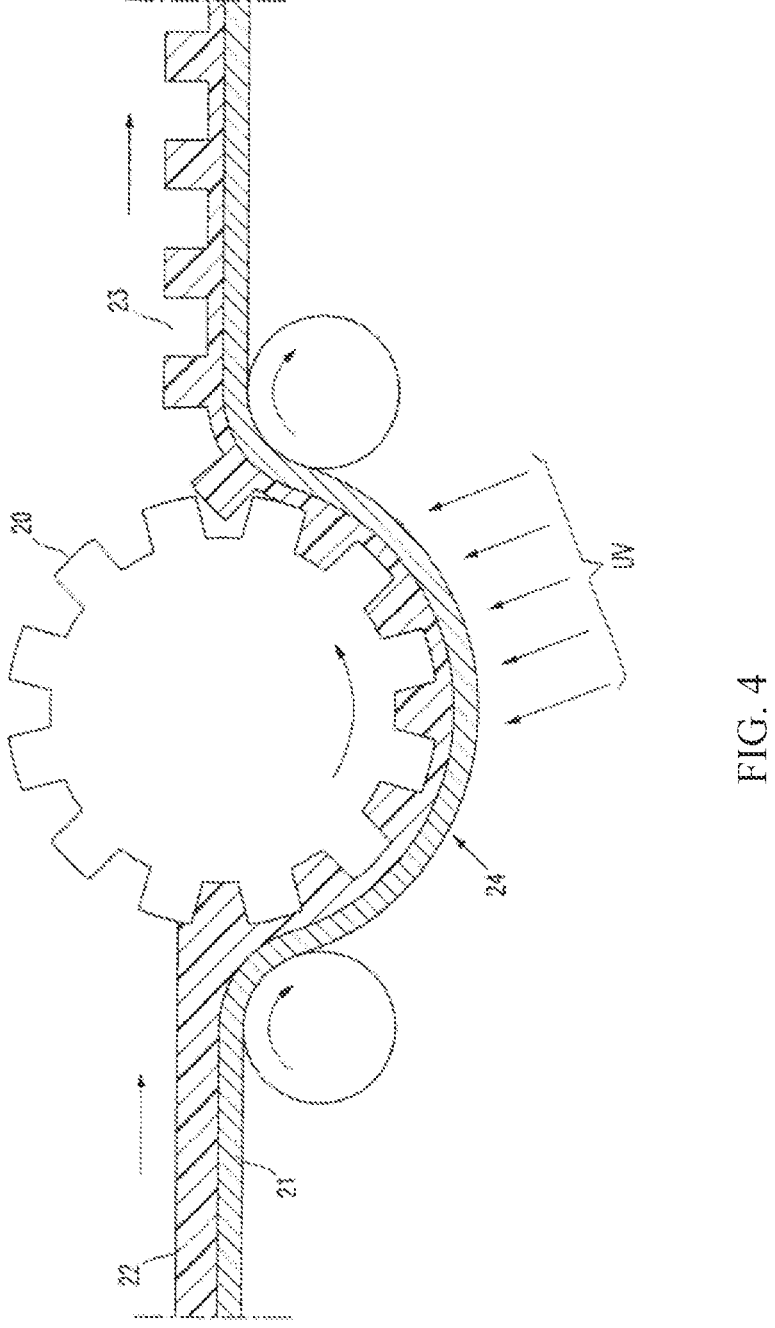
FIG. 4 shows a method for making microcells for the invention using a roll-to-roll process.

The mechanism of the gravity-actuated overlay display 80 is detailed in FIGS. 8B to 8D, which are top views of the device. As shown in FIG. 8B, a logo 90 ("LOGO") is printed as a negative on the graphic overlay 85, which is made from a clear film. The area surrounding the logo 90 is color-matched to the match the dyed hydrocarbon solvent 14. As a result, when the gravity-actuated overlay display 80 is viewed from above, the logo 90 is not visible because the area surrounding the logo 90 is the same color as the dyed hydrocarbon solvent. (The logos 90 in FIGS. 8B and 8D are shaded slightly darker to aide understanding. In actual practice, the logo 90 would be virtually invisible to the untrained eye.) To verify the authenticity of the item to which the gravity-actuated overlay display 80 is attached, a user would flip over the gravity-actuated overlay display 80 wait for some time while the Techniques for constructing microcells. Microcells may be formed either in a batchwise process or in a continuous roll-to-roll process as disclosed in U.S. Pat. No. 6,933,098. The latter offers a continuous, low cost, high throughput manufacturing technology for production of compartments for use in a variety of applications including gravity-actuated displays. Microcell arrays suitable for use with the invention can be created with micro-embossing, as illustrated in FIG. 4. A male mold 20 may be placed either above the web 24, as shown in FIG. 4, or below the web 24 (not shown); however, alternative arrangements are possible. See U.S. Pat. No. 7,715,088, which is incorporated herein by reference in its entirety. A conductive substrate may be constructed by forming a conductor film 21 on polymer substrate that becomes the backing for a device. A composition comprising a thermoplastic, thermoset, or a precursor thereof 22 is then coated on the conductor film. The thermoplastic or thermoset precursor layer is embossed at a temperature higher than the glass transition temperature of the thermoplastics or thermoset precursor layer by the male mold in the form of a roller, plate or belt.

The thermoplastic or thermoset precursor for the preparation of the microcells may be multifunctional acrylate or methacrylate, vinyl ether, epoxide and oligomers or polymers thereof, and the like. A combination of multifunctional epoxide and multifunctional acrylate is also very useful to achieve desirable physico-mechanical properties. A cross-linkable oligomer imparting flexibility, such as urethane acrylate or polyester acrylate, may be added to improve the flexure resistance of the embossed microcells. The composition may contain polymer, oligomer, monomer and additives or only oligomer, monomer and additives. The glass transition temperatures (or $T_g$) for this class of materials usually range from about −70° C. to about 150° C., preferably from about −20° C. to about 50° C. The microembossing process is typically carried out at a temperature higher than the $T_g$. A heated male mold or a heated housing substrate against which the mold presses may be used to control the microembossing temperature and pressure.

As shown in FIG. 4, the mold is released during or after the precursor layer is hardened to reveal an array of micro-cells 23. The hardening of the precursor layer may be accomplished by cooling, solvent evaporation, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer. A male mold may be prepared by any appropriate method, such as a diamond turn process or a photoresist process followed by either etching or electroplating. A master template for the male mold may be manufactured by any appropriate method, such as electroplating. With elec-troplating, a glass base is sputtered with a thin layer (typi-cally 3000 Å) of a seed metal such as chrome inconel. The mold is then coated with a layer of photoresist and exposed to UV. A mask is placed between the UV and the layer of photoresist. The exposed areas of the photoresist become hardened. The unexposed areas are then removed by wash-ing them with an appropriate solvent. The remaining hard-ened photoresist is dried and sputtered again with a thin layer of seed metal. The master is then ready for electro-forming. A typical material used for electroforming is nickel cobalt. Alternatively, the master can be made of nickel by electroforming or electroless nickel deposition. The floor of the mold is typically between about 50 to 400 microns. The master can also be made using other microengineering techniques including e-beam writing, dry etching, chemical etching, laser writing or laser interference as described in "Replication techniques for micro-optics", SPIE Proc. Vol. 3099, pp. 76-82 (1997). Alternatively, the mold can be made by photomachining using plastics, ceramics or metals.

Prior to applying a UV curable resin composition, the mold may be treated with a mold release to aid in the demolding process. The UV curable resin may be degassed prior to dispensing and may optionally contain a solvent. The solvent, if present, readily evaporates. The UV curable resin is dispensed by any appropriate means such as, coat-ing, dipping, pouring or the like, over the male mold. The dispenser may be moving or stationary. A conductor film is overlaid the UV curable resin. Pressure may be applied, if necessary, to ensure proper bonding between the resin and the plastic and to control the thickness of the floor of the microcells. The pressure may be applied using a laminating roller, vacuum molding, press device or any other like means. If the male mold is metallic and opaque, the plastic substrate is typically transparent to the actinic radiation used to cure the resin. Conversely, the male mold can be trans-parent and the plastic substrate can be opaque to the actinic radiation. To obtain good transfer of the molded features onto the transfer sheet, the conductor film needs to have good adhesion to the UV curable resin that should have a good release property against the mold surface.

Figures 5A, 5B:
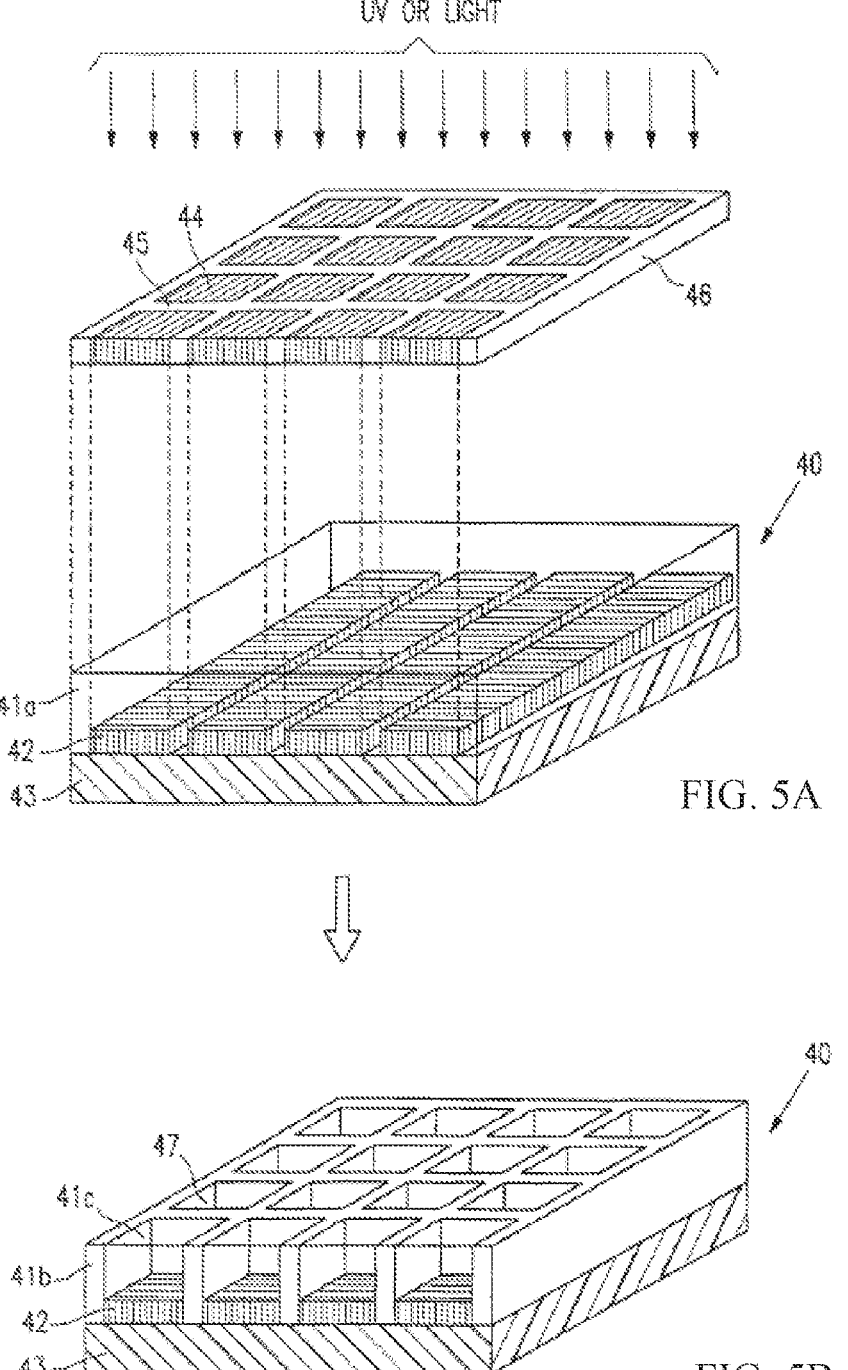
FIGS. 5A and 5B detail the production of microcells for gravity-actuated display system using photolithographic exposure through a photomask of a conductor film coated with a thermoset precursor.

Photolithography. Microcells can also be produced using photolithography. Photolithographic processes for fabricat-ing a microcell array are illustrated in FIGS. 5A and 5B. As shown in FIGS. 5A and 5B, the microcell array 40 may be prepared by exposure of a radiation curable material 41a coated by known methods onto a conductor electrode film 42 to UV light (or alternatively other forms of radiation, electron beams and the like) through a mask 46 to form walls 41b corresponding to the image projected through the mask 46. The base conductor film 42 is preferably mounted on a supportive substrate base web 43, which may comprise a plastic material.

In the photomask 46 in FIG. 5A, the dark squares 44 represent the opaque area and the space between the dark squares represents the transparent area 45 of the mask 46. The UV radiates through the transparent area 45 onto the radiation curable material 41a. The exposure is preferably performed directly onto the radiation curable material 41a, i.e., the UV does not pass through the substrate 43 or base conductor 42 (top exposure). For this reason, neither the substrate 43, nor the conductor 42, needs to be transparent to the UV or other radiation wavelengths employed.

As shown in FIG. 5B, the exposed areas 41b become hardened and the unexposed areas (protected by the opaque area 44 of the mask 46) are then removed by an appropriate solvent or developer to form the microcells 47. The solvent or developer is selected from those commonly used for dissolving or reducing the viscosity of radiation curable materials such as methylethylketone (MEK), toluene, acetone, isopropanol or the like. The preparation of the microcells may be similarly accomplished by placing a photomask underneath the conductor film/substrate support web and in this case the UV light radiates through the photomask from the bottom and the substrate needs to be transparent to radiation.

Figure 5D:
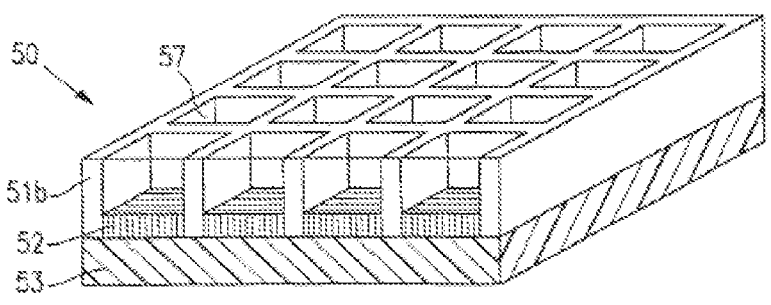
FIGS. 5C and 5D detail an alternate embodiment in which microcells for a gravity-actuated display are fabricated using photolithography.
Figure 5C:
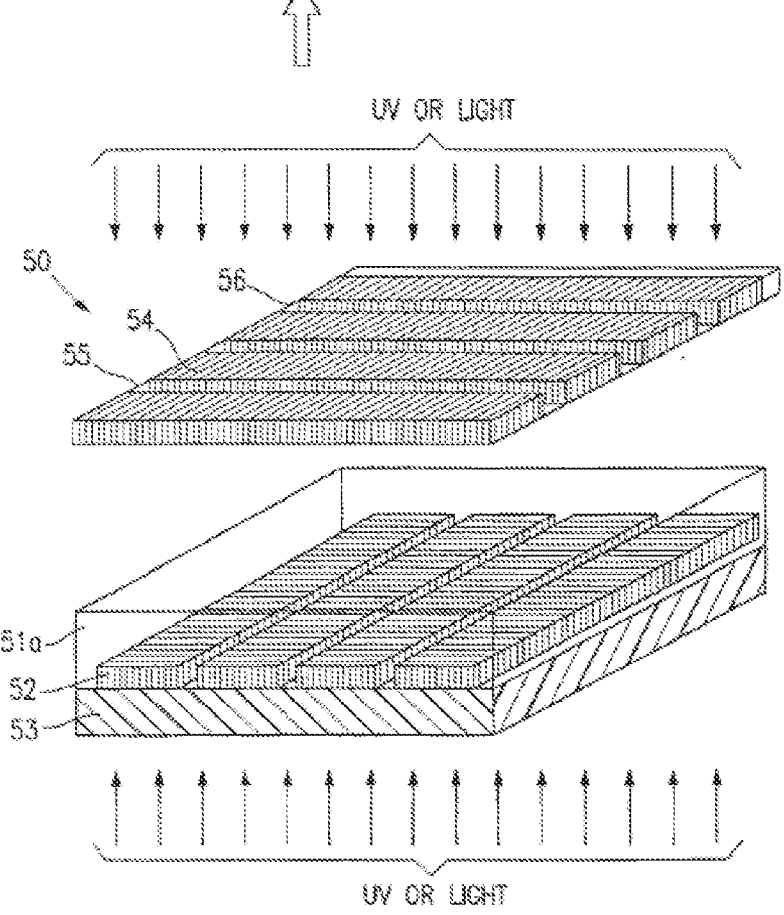

Imagewise Exposure. Still another alternative method for the preparation of the microcell array of the invention by imagewise exposure is illustrated in FIGS. 5C and 5D. When opaque conductor lines are used, the conductor lines can be used as the photomask for the exposure from the bottom. Durable microcell walls are formed by additional exposure from the top through a second photomask having opaque lines perpendicular to the conductor lines. FIG. 5C illus-trates the use of both the top and bottom exposure principles to produce the microcell array 50 of the invention. The base conductor film 52 is opaque and line-patterned. The radia-tion curable material 51a, which is coated on the base conductor 52 and substrate 53, is exposed from the bottom through the conductor line pattern 52, which serves as the first photomask. A second exposure is performed from the "top" side through the second photomask 56 having a line pattern perpendicular to the conductor lines 52. The spaces 55 between the lines 54 are substantially transparent to the UV light. In this process, the wall material 51b is cured from the bottom up in one lateral orientation, and cured from the top down in the perpendicular direction, joining to form an integral microcell 57. As shown in FIG. 5D, the unexposed area is then removed by a solvent or developer as described above to reveal the microcells 57.

After the microcells are produced, they are filled with appropriate mixtures of dyed hydrocarbon solvents and high density reflective particles. The microcell array 60 may be prepared by any of the methods described above. As shown in cross-section in FIGS. 6A-6D, the microcell walls 61 extend upward from the light-transmissive substrate 63 to form the open cells. Optionally, the microcells may include a primer layer 62 to passivate bottom of the microcells to prevent the high density reflective particles from sticking to the cell floor and/or walls.

Figures 6A, 6B, 6C, 6D:
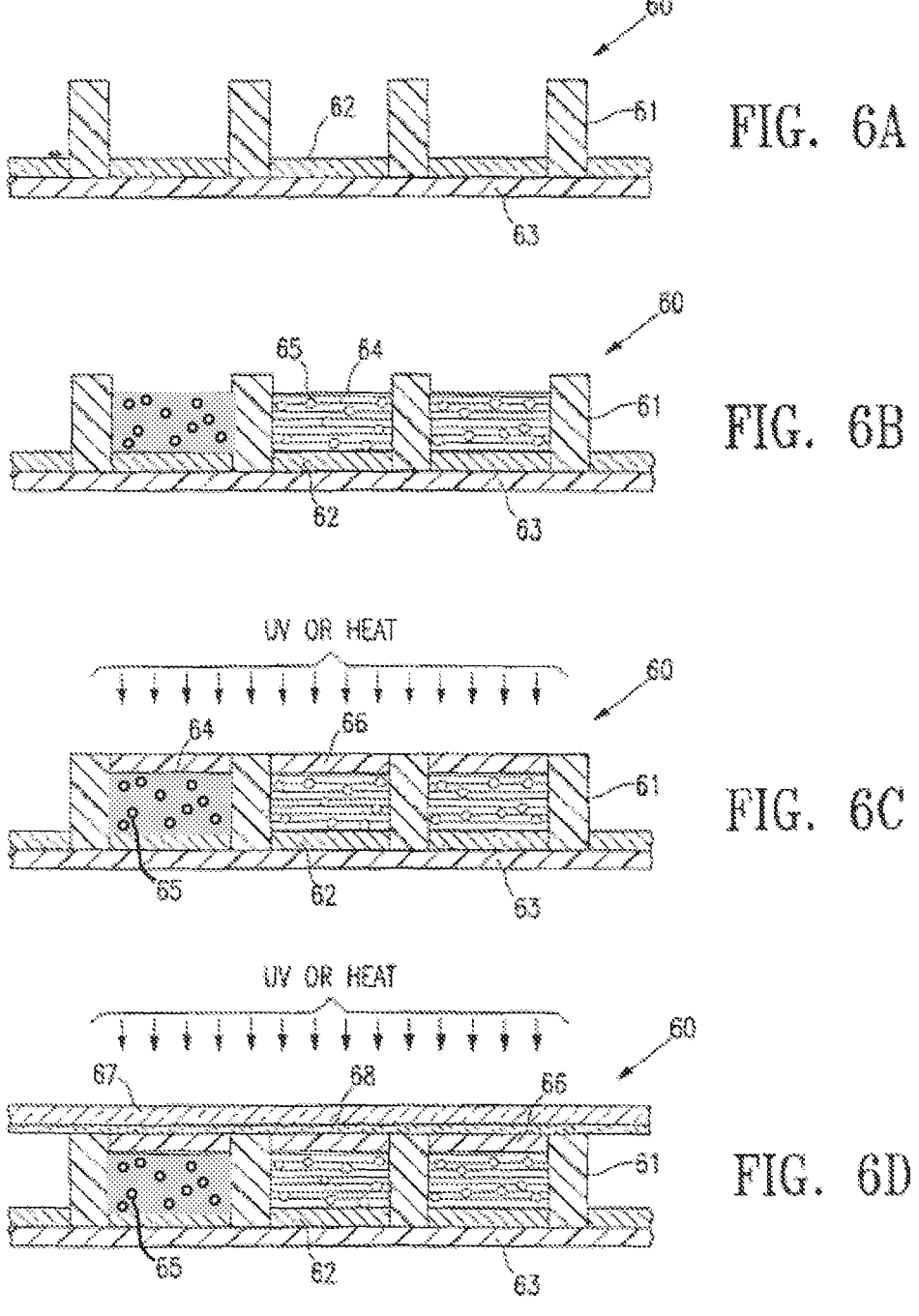
FIGS. 6A-6D illustrate the steps of filling and sealing an array of microcells to be used in a gravity-actuated display.

The microcells are next filled with the dyed hydrocarbon mixture 64, including high density reflective particles 65. In some embodiments dyed hydrocarbon mixture 64, including high density reflective particles 65 will be sonicated prior to filling the microcells to produce a consistent mixture of high density reflective particles 65 in the dyed hydrocarbon mixture 64. In some embodiments, not shown in the figures, the desired amount of high density reflective particles 65 are distributed in the microcells, whereupon dyed hydrocarbon mixture 64 is then filled into the various microcells. In some embodiments filling the microcells with high density reflective particles 65 is facilitated with gentle agitation. The filling may be done with pipettes, gravity fill-dispensers, or squeegee. As shown in FIG. 6B, different microcells may include different dyed hydrocarbon mixtures, as discussed above with respect to FIGS. 2 and 3. The microcells 60 are preferably partially filled to prevent overflow and the unintentional mixing of differently-dyed hydrocarbon mixtures.

The microcells may be filled using a variety of techniques. In some embodiments, where a large number of neighboring microcells are to be filled with an identical mixture, blade coating may be used to fill the microcells to the depth of the microcell walls 61. In other embodiments, a slot die with positionable channels can be used to fill a multiple types of dyed hydrocarbon mixtures simultaneously. In still other embodiments, where different mixtures are to be filled in a variety of nearby microcells, inkjet-type microinjection can be used to fill the microcells. In yet other embodiments, microneedle arrays or pipettes may be used to fill an array of microcells with the correct sequence of dyed hydrocarbon mixtures.

As shown in FIG. 6C, after filling, the microcells are sealed by applying a polymer 66 that becomes light-transmissive sealing layer. The light-transmissive sealing material may include polyvinyl alcohol, polyvinylpyrrolidone, polyurethane, polyisobutylene, or acrylates. In some embodiments, the sealing process may involve exposure to heat, dry hot air, or UV radiation. In most embodiments, the polymer 66 will be compatible with the mixture 64, but not dissolved by the hydrocarbon fluid. Accordingly, the final microcell structure is mostly impervious to leaks and able to withstand flexing without delamination of the light-transmissive sealing layer.

After the microcells 60 are filled, the sealed array may be laminated to a top light-transmissive substrate 67, using a thin layer of an optically clear adhesive (OCA) 68. The light-transmissive substrate 67 may be a polyethylene film. While it is not shown in FIGS. 6A-6D, a bottom light-transmissive substrate can also be added to the opposite side of the microcell array using another layer of OCA. Additionally, the edges of the microcell array 60 may be sealed with a polymer, such as a polyurethane, to prevent leakage of the hydrocarbon fluid. In alternative embodiments, the filled and sealed microcell array may be encapsulated and sealed with a polyethylene film preform and the edges pinch sealed with heat or with a laser.

Example 1—Gravity Actuated Display with Silver Flake

Figure 7:
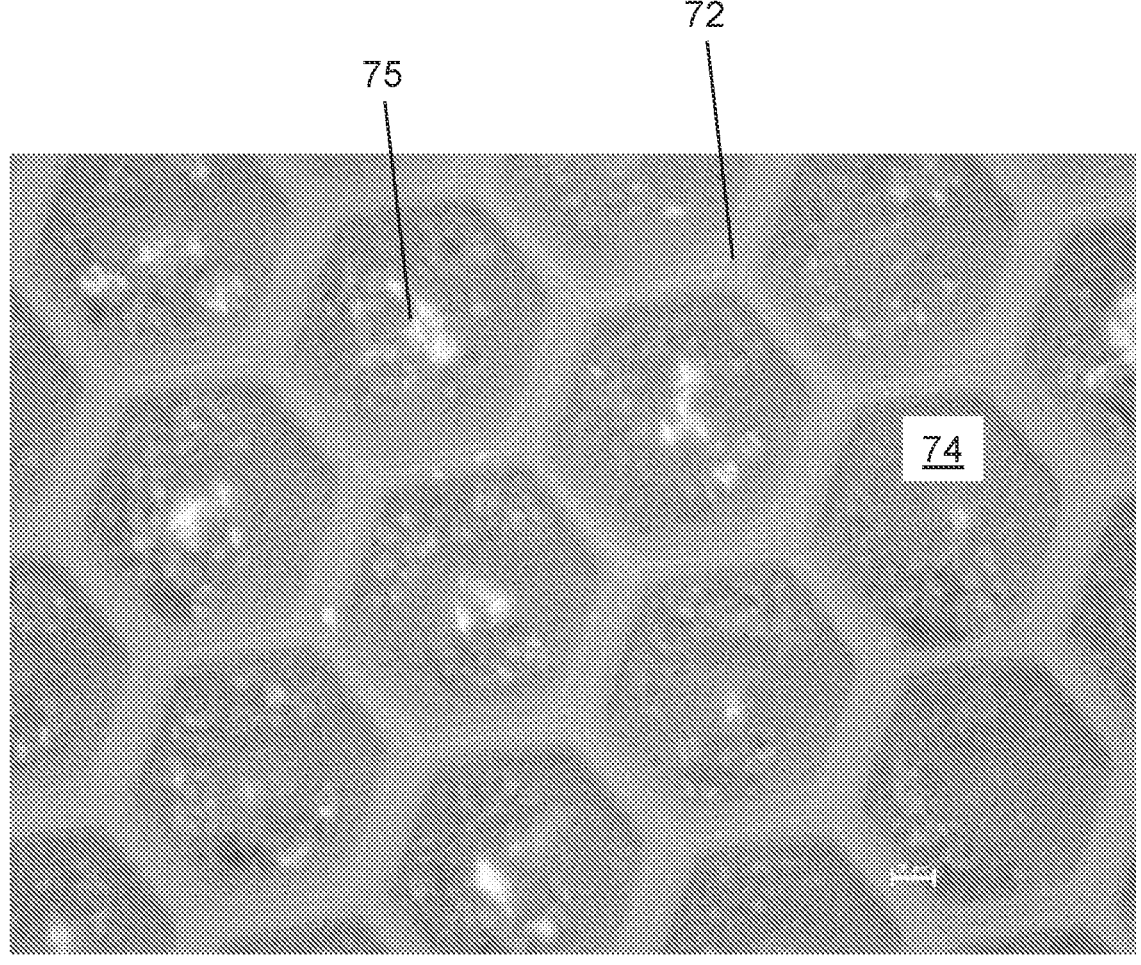
FIG. 7 is a microscopic image of a layer of microcells filled with a mixture including a blue dye. The cells are sealed with a light-transparent sealing layer comprising polyisobutylene.

A microcell layer was prepared by microembossing polyethylene terephthalate (PET) as described above. A dyed hydrocarbon mixture was prepared by adding 30 grams of 10 μm silver flake (Sigma Aldrich) to 140 mL of Isopar® E along with 5 mL of Solsperse 19000 (Lubrizol), and 3 grams of Solvent Blue 89 HF (Abbey Color). The mixture was sonicated for 10 minutes and then the sonicated mixture was dispensed into microcells with a pipette, and the remnant dyed hydrocarbon mixture was removed from the top of the microcells with a rubber spatula. The filled microcells were overcoated with a light-transmissive sealing material of 1 part (by weight) polyurethane (HD2125; Hauthaway Corp.) to four parts polyvinyl alcohol (Z410; Mitsubishi Chemical)

to 2 parts DI water. A wet coating thickness of 8 mils (0.21032 mm) of the sealing material was applied on top of the filled microcells and the coated sealing material was subsequently dried to create a light-transmissive sealing layer. A microscope view of the filled and sealed microcell layer is shown in FIG. 7. The microcell walls (72) are spanned by the polyurethane sealing layer (74) and some of the silver flake particles (75) are visible through the polyurethane sealing layer (74). After the gravity actuated display has been sitting, it appears blue from above, as shown in FIG. 7. If the gravity actuated display is flipped over the new viewing surface is momentarily shiny because of the reflective silver particles at the viewing surface. The shiny surface quickly starts to fade and the original blue color has returned after three seconds.

Example 2—Gravity Actuated Display with Bronze Flake

A microcell layer was prepared by microembossing polyethylene terephthalate (PET) as described above. A dyed hydrocarbon mixture was prepared by adding 15 grams of 50 μm bronze metal flake (Bravo Bronze, Lebanon, Tennessee) to 140 mL of Isopar® E along with 5 mL of Solsperse 19000 (Lubrizol), and 3 grams of Solvent Blue 89 HF (Abbey Color). The mixture was sonicated for 10 minutes and then the sonicated mixture was dispensed into microcells with a pipette, and the remnant dyed hydrocarbon mixture was removed from the top of the microcells with a rubber spatula. The filled microcells were overcoated with a light-transmissive sealing material of 1 part (by weight) polyurethane (HD2125; Hauthaway Corp.) to four parts polyvinyl alcohol (Z410; Mitsubishi Chemical) to 2 parts DI water. A wet coating thickness of 8 mils (0.21032 mm) of the sealing material was applied on top of the filled microcells and the coated sealing material was subsequently dried to create a light-transmissive sealing layer. If the gravity actuated display is flipped over the new viewing surface is momentarily yellow and shiny because of the reflective bronze particles at the viewing surface. The shiny surface quickly starts to fade and the original blue color has returned after five seconds. A subsequent sample was prepared with 1 gram of Solvent Blue 89 HF for 140 mL of Isopar® E, which had a lighter blue base color, and a pronounced transition from shiny yellow to green to blue after the device was flipped over.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A gravity-actuated display comprising:
an array of microcells, each microcell having walls, a floor, and a top opening, wherein the floor of each microcell is light-transmissive;
a first mixture comprising between 5-15% of a surfactant (wt surfactant/wt mixture), between 20-50% of reflective particles having a density greater than 7 grams/cm$^3$, (wt particles/wt mixture), between 1-8% of a first soluble dye (wt soluble dye/wt mixture) and a balance of hydrocarbon solvent, wherein the first mixture is disposed in at least some of the microcells in the array; and
a light-transmissive sealing layer that seals the first mixture into the at least some of the microcells.

2. The gravity-actuated display of claim 1, further comprising a first light-transmissive substrate coupled to the array of microcells.

3. The gravity-actuated display of claim 2, further comprising a second light-transmissive substrate coupled to the light transmissive sealing layer.

4. The gravity-actuated display of claim 1, wherein the display is less than 1 mm thick.

5. The gravity-actuated display of claim 4, wherein the display is less than 200 μm thick.

6. The gravity-actuated display of claim 1, further comprising a second mixture comprising the reflective particles, the hydrocarbon solvent, and a second soluble dye, wherein the second mixture is disposed in at least some of the microcells that are different from the at least some of the microcells in which the first mixture is disposed.

7. The gravity-actuated display of claim 6, wherein the first and second soluble dyes are different colors.

8. The gravity-actuated display of claim 1, wherein the reflective particles comprise silver, tungsten, gold, platinum, nickel, copper, tin, zinc, or indium.

9. The gravity-actuated display of claim 8, wherein the reflective particles comprise a bronze alloy.

10. The gravity-actuated display of claim 8, wherein the reflective particles are between 5 μm and 25 μm in longest dimension.

11. The gravity-actuated display of claim 1, wherein the first soluble dye comprises anthraquinone, phtalocyanine, naphthalene, indole, imidazole, or thioindigo compounds.

12. The gravity-actuated display of claim 1, wherein the microcell walls and floor comprise acrylates, vinyl ethers, or epoxides.

13. The gravity-actuated display of claim 1, wherein the sealing layer comprises polyvinyl alcohol, polyvinylpyrrolidone, polyurethane, polyisobutylene, or acrylates.

14. The gravity-actuated display of claim 1, further comprising a graphic overlay that masks a portion of the display from a viewer and is color matched to the reflective particles or to the soluble dye.

15. A gravity-actuated display comprising:
an array of microcells, each microcell having walls, a floor, and a top opening, wherein the floor of each microcell is light-transmissive;
a first mixture comprising reflective particles having a density greater than 7 grams/cm$^3$, a hydrocarbon solvent, and a first soluble dye, wherein the first mixture is disposed in at least some of the microcells in the array; and

14 a light-transmissive sealing layer that seals the first mixture into the at least some of the microcells,
wherein the gravity-actuated display does not include any layers having a conductivity greater than 1×10$^4$ Ohm cm.

16. The gravity-actuated display of claim 15, further comprising a second mixture comprising the reflective particles, the hydrocarbon solvent, and a second soluble dye, wherein the second mixture is disposed in at least some of the microcells that are different from the at least some of the microcells in which the first mixture is disposed.

17. The gravity-actuated display of claim 16, wherein the first and second soluble dyes are different colors.

18. The gravity-actuated display of claim 15, wherein the sealing layer comprises polyvinyl alcohol, polyvinylpyrrolidone, polyurethane, polyisobutylene, or acrylates.

19. The gravity-actuated display of claim 15, further comprising a graphic overlay that masks a portion of the display from a viewer and is color matched to the reflective particles or to the soluble dye.

20. A gravity-actuated display comprising:
an array of microcells, each microcell having walls, a floor, and a top opening, wherein the floor of each microcell is light-transmissive;
a first mixture comprising reflective particles having a density greater than 7 grams/cm$^3$, a hydrocarbon solvent, and a first soluble dye, wherein the hydrocarbon solvent comprises aliphatic molecules having a molecular weight between 100 g/mol and 300 g/mol, and wherein the first mixture is disposed in at least some of the microcells in the array; and
a light-transmissive sealing layer that seals the first mixture into the at least some of the microcells.

21. The gravity-actuated display of claim 20, further comprising a second mixture comprising the reflective particles, the hydrocarbon solvent, and a second soluble dye, wherein the second mixture is disposed in at least some of the microcells that are different from the at least some of the microcells in which the first mixture is disposed.

22. The gravity-actuated display of claim 21, wherein the first and second soluble dyes are different colors.

23. The gravity-actuated display of claim 20, wherein the sealing layer comprises polyvinyl alcohol, polyvinylpyrrolidone, polyurethane, polyisobutylene, or acrylates.

24. The gravity-actuated display of claim 20, further comprising a graphic overlay that masks a portion of the display from a viewer and is color matched to the reflective particles or to the soluble dye.

* * * * *